United States Patent
Yamaguchi et al.

(10) Patent No.: US 11,151,413 B2
(45) Date of Patent: Oct. 19, 2021

(54) IMAGE PROCESSING DEVICE, METHOD AND NON-TRANSITORY COMPUTER READABLE MEDIUM

(71) Applicant: FUJIFILM Business Innovation Corp., Tokyo (JP)

(72) Inventors: Akinobu Yamaguchi, Kanagawa (JP); Shintaro Adachi, Kanagawa (JP); Kunikazu Ueno, Kanagawa (JP); Yang Liu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/535,086

(22) Filed: Aug. 8, 2019

(65) Prior Publication Data

US 2020/0302220 A1    Sep. 24, 2020

(30) Foreign Application Priority Data

Mar. 19, 2019 (JP) ............................. JP2019-051505

(51) Int. Cl.
*G06K 9/62* (2006.01)
*G06K 9/34* (2006.01)
*G06K 9/46* (2006.01)

(52) U.S. Cl.
CPC ............. *G06K 9/623* (2013.01); *G06K 9/344* (2013.01); *G06K 9/4614* (2013.01); *G06K 9/6256* (2013.01); *G06K 2209/01* (2013.01)

(58) Field of Classification Search
CPC ...... G06K 9/623; G06K 9/6256; G06K 9/344; G06K 9/4614; G06K 9/40; G06K 9/6274; G06K 2209/01
See application file for complete search history.

(56) References Cited

U.S. PATENT DOCUMENTS

| 7,499,588 B2 | 3/2009 | Jacobs et al. |
| 10,832,046 B1 * | 11/2020 | Al-Gharaibeh .......... G06N 3/04 |
| 2009/0009821 A1 * | 1/2009 | Machida ............... G06F 9/5044 358/471 |
| 2009/0110288 A1 * | 4/2009 | Fujiwara ............ G06K 9/00463 382/190 |
| 2011/0197204 A1 * | 8/2011 | Archer ................... G06F 9/546 719/315 |
| 2015/0363660 A1 * | 12/2015 | Vidal ................... G06K 9/4642 382/173 |

FOREIGN PATENT DOCUMENTS

JP       2011008802       1/2011

OTHER PUBLICATIONS

Phillip Isola et al., "Image-to-Image Translation with Conditional Adversarial Networks", Berkeley AI Research (BAIR) Laboratory, UC Berkeley, Nov. 26, 2018.

* cited by examiner

*Primary Examiner* — Edward F Urban
*Assistant Examiner* — Wassim Mahrouka
(74) *Attorney, Agent, or Firm* — JCIPRNET

(57) ABSTRACT

An image processing device includes multiple image processing units, each trained to accommodate a different feature possibly contained in an image, a decision unit that decides a sequence of the multiple image processing units according to the features contained in an input image, and an application unit that applies the image processing units to the input image in the sequence decided by the decision unit.

9 Claims, 13 Drawing Sheets

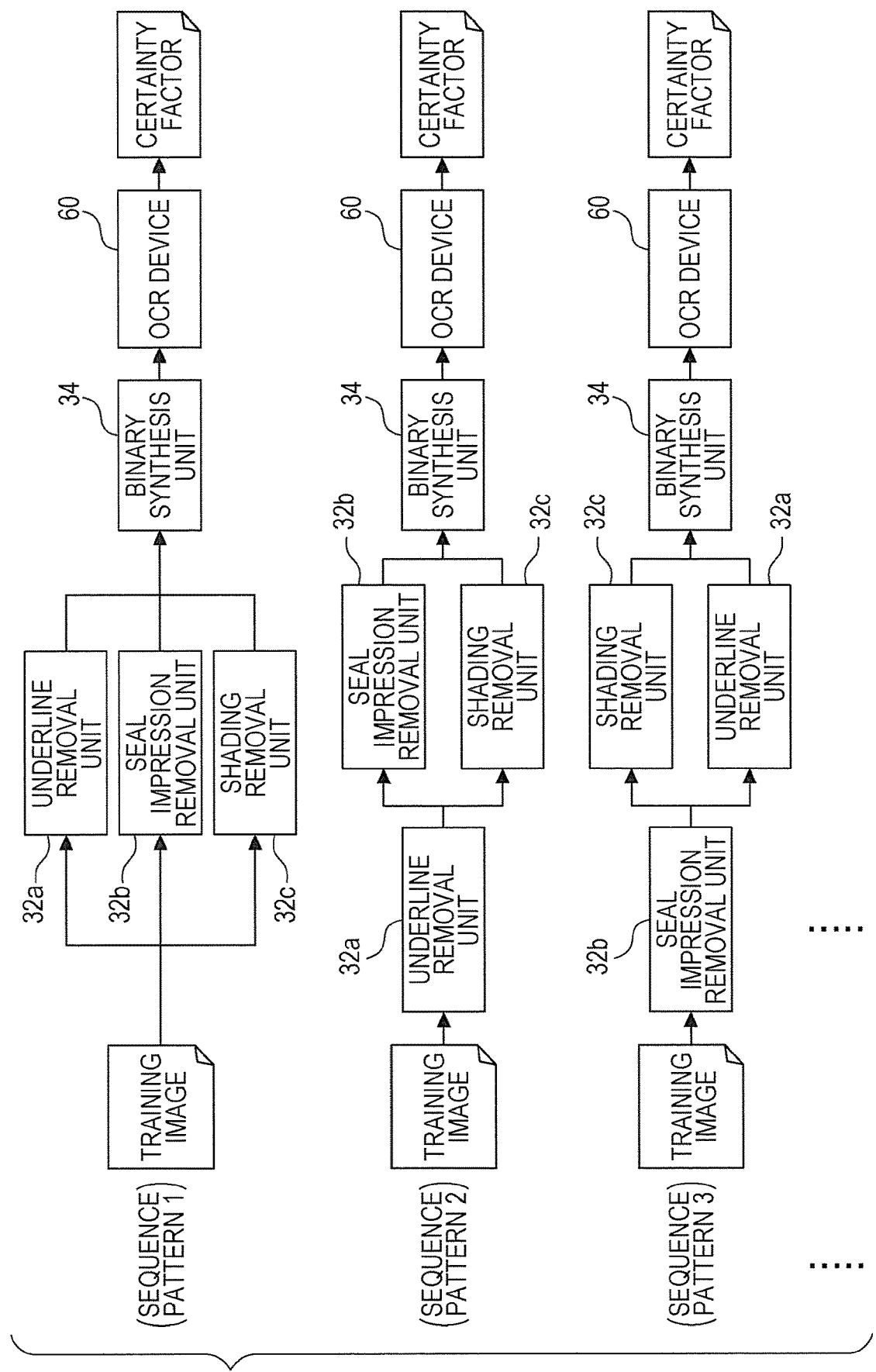

IMAGE PROCESSING DEVICE, METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-051505 filed Mar. 19, 2019.

BACKGROUND

(i) Technical Field

The present disclosure relates to an image processing device and a non-transitory computer readable medium.

(ii) Related Art

Systems that perform image processing by using a device that learns image processing such as the conversion, alteration, and generation of images by machine learning are increasing.

Japanese Unexamined Patent Application Publication No. 2011-008802 discloses a system that uses a neural network to perform pre-processing, layout analysis, character recognition processing, and the like in an optical character recognition (OCR) process with respect to a photographed document.

The image to be processed includes several types of features, such as background patterns, seal impressions, color backgrounds, and shading.

SUMMARY

Although it is not impossible to teach a single image processing unit the image processing corresponding to all of multiple features that may be included in an image, there are problems such as lowered accuracy and generalization, degraded training efficiency, and a difficulty in guaranteeing quality when performing additional training. Accordingly, it is conceivable to teach each of multiple image processing units image processing corresponding to respectively different features, and by using these image processing units in combination, achieve image processing corresponding to all of the multiple features.

However, if an image processing unit that has been trained to handle a certain feature receives the input of an image including a different feature not contained in the images learned by the image processing unit, in some cases the image processing unit may output an unexpected processing result and negatively affect the processing in a downstream image processing unit.

For example, in the case of an image processing unit that has learned how to remove shading from sample images that contain shading but not background patterns, if an image including both shading and a background pattern is input, in some cases the image processing unit may be unable to exhibit the expected performance regarding the removal of shading, and may also perform an unexpected conversion on the background pattern. As a result, an image processing unit that performs background pattern removal next may be unable to remove the converted background pattern appropriately. Conversely, if these two image processing units are applied to the same image in the reverse sequence, as a result of the background pattern being removed first, the removal of shading is performed appropriately, and the final image processing result may be more favorable than in the case of the initial order.

In this way, if the sequence in which multiple image processing units corresponding to multiple features are applied to an image changes, the quality of the final image processing result may change considerably in some situations.

Aspects of non-limiting embodiments of the present disclosure relate to obtaining a more favorable image processing result than a method in which multiple image processing units that have been trained to handle respectively different features are applied in a fixed sequence.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing device including multiple image processing units, each trained to accommodate a different feature possibly contained in an image, a decision unit that decides a sequence of the multiple image processing units according to the features contained in an input image, and an application unit that applies the image processing units to the input image in the sequence decided by the decision unit.

BRIEF DESCRIPTION OF THE DRAWINGS

An exemplary embodiment of the present disclosure will be described in detail based on the following figures, wherein:

FIG. 8A is a diagram for explaining a process of computing patterns of sequences in which to apply image conversion filters to a training image;

DETAILED DESCRIPTION

Overview of Exemplary Embodiment

Figure 1:
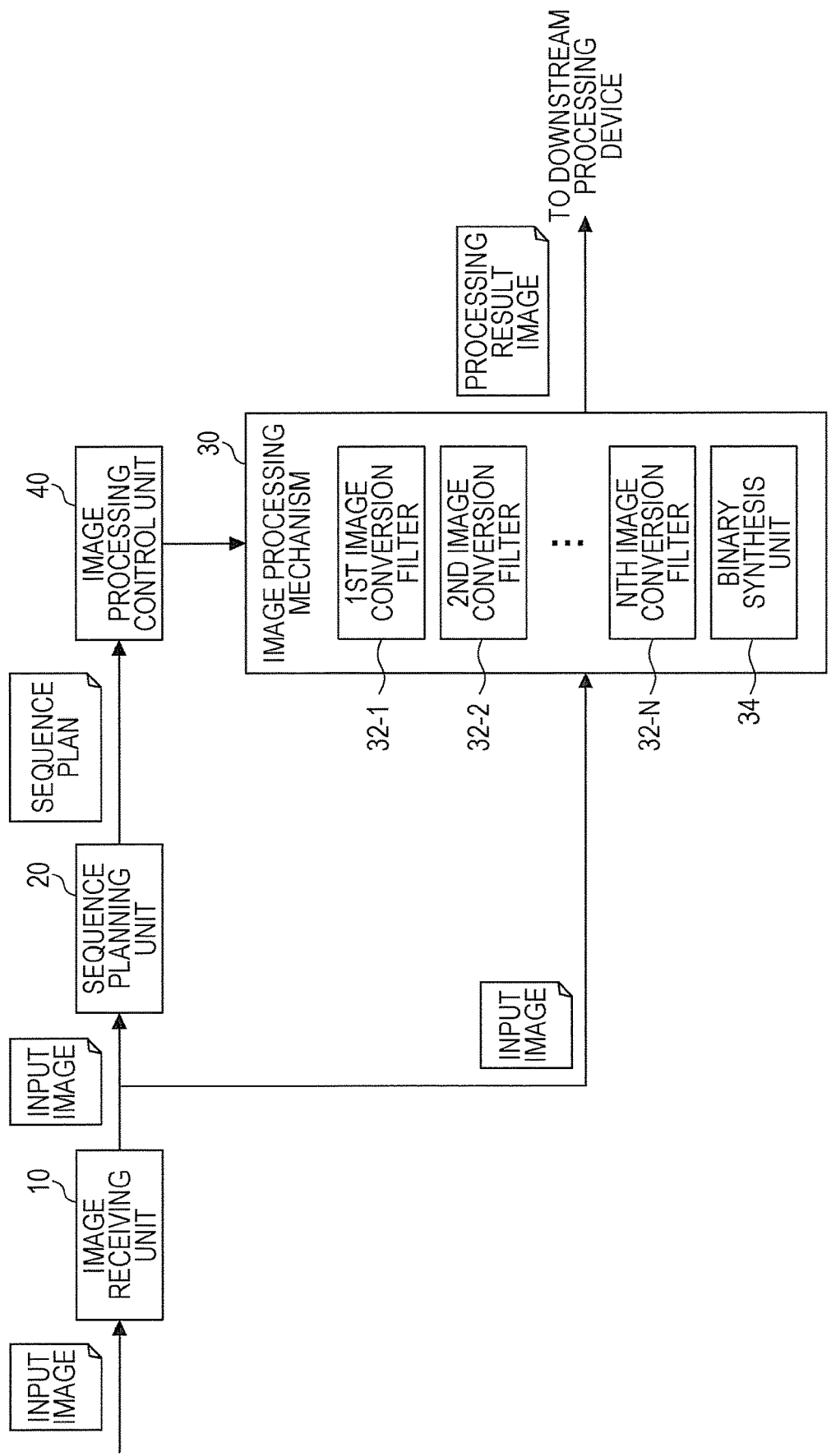
FIG. 1 is a diagram illustrating a configuration of the image processing device according to the exemplary embodiment.

FIG. 1 illustrates an example of the configuration of the image processing device according to the exemplary embodiment of the present disclosure.

The image processing device in FIG. 1 includes an image receiving unit 10, a sequence planning unit 20, an image processing mechanism 30, and an image processing control unit 40.

The image processing device is a device that converts an input image into a processing result image of a quality suited to processing by a downstream processing device. The processing result image is one example of an image processing result by the image processing device with respect to the input image. Conceivable downstream processing devices include, for example, an optical character recognition (OCR) device and a face identification device that identifies individual faces from images.

The image receiving unit 10 receives the input of the input image from an external source.

The image processing mechanism 30 includes multiple image processing units. In the illustrated example, N image conversion filters 32 (namely a first image conversion filter 32-1, a second image conversion filter 32-2, and so on to an Nth image conversion filter 32-N) and a binary synthesis unit 34. The image conversion filters 32 are filters that perform some kind of conversion, such as underline removal and shading removal described later, on an image. The binary synthesis unit 34 binarizes each of multiple input images, and then synthesizes the images by taking the AND operation of each pixel. The binary synthesis unit 34 is an image processing unit that is particularly useful in the case where the downstream processing device is an OCR device. The set of image conversion filters 32 included in the image processing mechanism 30 is one example of a population of image processing units.

The individual image processing units, for example the illustrated N image conversion filters 32 and the binary synthesis unit 34, may be implemented as software executed on a computer or may be configured as static hardware circuits. In addition, the individual image processing units may also be implemented using a reconfigurable circuit such as an field-programmable gate array (FPGA) or a dynamically reconfigurable processor (DRP), or a circuit having a reconfigurable neural network with a variety of software-like capabilities, such as a neurochip.

Image processing performed by the image processing device with respect to an input image does not necessarily involve all of the image processing units provided in the image processing mechanism 30, and in many cases, it is sufficient to use just a subset of the image processing units in combination with each other. Consequently, even in the case of implementing the individual image processing units as hardware circuits, it is not necessary for the image processing mechanism 30 to have static hardware circuits for all of the image processing units. In this case, it is sufficient each of a finite number of reconfigurable circuits or neurochips included in the image processing device itself to be configured to act as each image processing unit decided to be used in the image processing with respect to the input image. Additionally, by configuring the interconnects of input and output relationships among these image processing units, a circuit for image processing suited to the input image is completed. In the case of implementing the image processing units as software, by executing the software of each image processing unit decided to be used with respect to the input image in the sequence in which the image processing units are to be used, a process flow for image processing suited to the input image is completed.

The sequence planning unit 20 generates a sequence plan indicating which of the multiple image processing units to apply in which sequence to an input image to convert the input image into a processing result image of desired quality. In other words, when an input image is input, the sequence planning unit 20 outputs a sequence plan for that input image. The sequence plan may not only express a serial sequence in which multiple image processing units are applied in series, but may also express a sequence including portions in which several image processing units are executed in parallel. The sequence planning unit is one example of a decision unit that decides the sequence of the image processing units.

The image processing control unit 40 follows the sequence plan output by the sequence planning unit 20 to control the application of the processing by each image processing unit in the image processing mechanism 30 to the input image. The image processing control unit 40 is one example of an application unit that applies the image processing units in the sequence decided by the decision unit.

Next, one reason for taking the configuration of the image processing device illustrated in FIG. 1 will be described while referring to a specific example. Herein, as the specific example, a case of inputting an image of a form into an OCR device and recognizing a character string in each field of the form will be considered. In this case, it is not uncommon for the image of the form to include features that act as noise with respect to the character strings in the form to be recognized, such as underlines, shading, seal impressions (for example, the official seal of a company), and background patterns. For this reason, to improve the accuracy rate of the OCR result, it is desirable to remove these features that act as noise from the input image.

The case of teaching a neural network image processing that removes a group of such features that act as noise (hereinafter referred to as noise features) will be considered. In this case, if a single neural network is taught how to remove all types of noise features that may possibly be contained in the input image, the accuracy and generalization may be lowered, the training efficiency may be degraded, and it may become difficult to guarantee quality when performing additional training. In contrast, if discrete neural networks are taught how to remove individual features, the individual neural networks become capable of removing the respectively corresponding features accurately.

Accordingly, to deal with a wide variety of noise features included in input images, the case of combining multiple neural networks that have learned how to remove the individual noise features will be considered. By applying the neural networks that remove these individual features in a sequence to an input image, the noise features contained in the input image are removed.

At this point, an issue to be addressed is that since each of the individual neural networks are trained separately, the individual neural networks are not expected to learn how to handle all possible cases. In some cases, a neural network that has finished learning how to remove a first noise feature may not have been trained using sample images that include images having a second noise feature different from the first noise feature superimposed. In this case, when an image having the second noise feature superimposed onto the first noise feature is input, there is not only a possibility that the neural network will be unable to remove the first noise feature from the image appropriately, but also that the neural network will output a substantially unexpected image as the processing result. In this way, if a single neural network is unable to output a processing result of sufficient quality, the processing results of the neural networks responsible for further image processing are also degraded, and the image quality of the final processing result of the image may adversely affect the processing by a downstream processing device.

However, by appropriately deciding the sequence in which to apply image processing to an input image, it is possible to achieve satisfactory image quality in the final processing result in many cases. For example, consider a case in which an input image including a first noise feature and a second noise feature is processed using a first neural network that removes the first noise feature and a second neural network that removes the second noise feature. In this case, if the input image is processed in the order of the first neural network and then the second neural network, the image quality of the processing result may be inadequate, whereas if processed in the reverse order, the image of the processing result may be of adequate quality.

In light of the above, in the exemplary embodiment, an application sequence of image processing units suited to the input image is computed by the sequence planning unit 20.

Note that herein, a case in which the neural networks acting as the image processing units remove noise features is taken as an example, but the image processing performed by the image processing units is not limited to the removal of noise features. Besides the above, the image processing units may also perform processing other than the removal of features, such as enhancing or transforming features contained in the image. In other words, it is sufficient for each individual image processing unit to perform some kind of corresponding image processing on a feature handled by that image processing unit from among several features contained in the input image.

However, for the sake of simplicity, the following takes the example of a case in which each of the image conversion filters 32 illustrated in FIG. 1 (these being one example of the image processing units) performs a process of removing a noise feature corresponding to itself from among noise features contained in the input image.

Next, an example of how to construct the image conversion filters 32 will be illustrated. In the following example, assume that the N image conversion filters 32 are configured by respectively teaching neural networks how to perform a corresponding image conversion. The neural networks may be configured in software or as hardware circuits.

Figure 2:
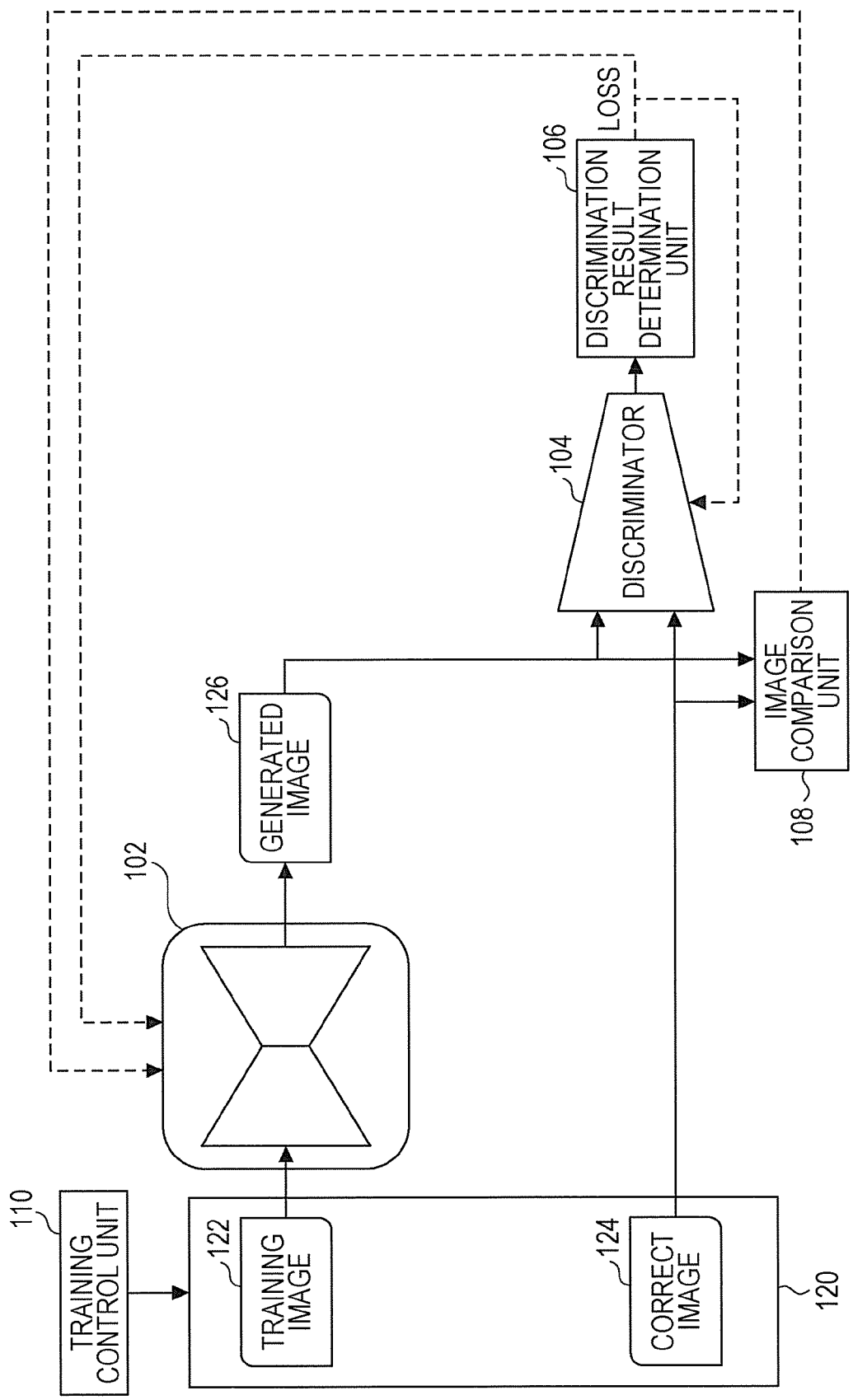
FIG. 2 is a diagram illustrating an example of a method of constructing an image conversion filter by training.

The image conversion filters 32 may be configured using a generative adversarial network (GAN), for example. One example of a setup that configures an image conversion filter using a GAN will be described with reference to FIG. 2. The GAN illustrated in FIG. 2 includes a generator 102 and a discriminator 104.

The GAN is trained using a set of training data 120 prepared in advance. Individual pieces of training data 120 included in the set include pairs of a training image 122 and a correct image 124. The training image 122 is an image containing the noise feature corresponding to the image conversion filter 32 to be configured. The correct image 124 paired with the training image 122 is an image obtained by removing the noise feature from the training image 122.

The generator 102 is a neural network that generates a generated image 126 from the training image 122. The generated image 126 is an image that estimates the correct image 124 corresponding to the training image 122. In other words, from the training image 122 containing the noise feature, the generator 102 generates the generated image 126 that is close to the correct image 124 not containing the noise feature. By training using a large number of training images 122, the generator 102 becomes capable of generating generated images 126 closer to the correct images 124.

The discriminator 104 is a neural network that discriminates whether an input image is the correct image 124 corresponding to the training image 122 or the generated image 126 generated by the generator 102 from the training image 122. A training control unit 110 inputs the correct image 124 or the generated image 126 into the discriminator 104. In response, the discriminator 104 discriminates whether the input image is the correct image 124 (in other words, "real") or the generated image 126 (in other words, "fake"), and outputs a signal indicating the discrimination result. Additionally, the discriminator 104 may also output a certainty factor of the discrimination result. The certainty factor refers to an evaluation value indicating the probability (that is, the degree of certainty) that the discrimination result is correct.

A discrimination result determination unit 106 determines whether the discrimination result of the discriminator 104 is true or false. For example, in the case in which the image input into the discriminator 104 is the correct image 124 and the corresponding discrimination result of the discriminator 104 is "correct image", the discrimination result is true. As another example, in the case in which the image input into the discriminator 104 is the generated image 126 and the corresponding discrimination result of the discriminator 104 is "correct image", the discrimination result is false. The discrimination result determination unit 106 is given answer information indicating whether the image input into the discriminator 104 is the correct image 124 or the generated image 126, and by referencing the answer information, the discrimination result determination unit 106 determines whether the discrimination result of the discriminator 104 is true or false. A loss signal computed from the determination result of the discrimination result determination unit 106 (that is, information indicating true or false) is fed back into the discriminator 104 and the generator 102. The discriminator 104 and the generator 102 are trained on the basis of the loss signal. Also, in addition to or instead of the loss signal, information about the certainty factor may also be fed back into the discriminator 104 and the generator 102 for training. Note that the technique of training the discriminator 104 and the generator 102 with the feedback of the determination result from the discrimination result determination unit 106 may be similar to that used in a GAN of the related art.

An image comparison unit 108 compares the correct image 124 to the generated image 126 generated by the generator 102 from the training image 122 corresponding to the correct image 124, and feeds back a signal indicating the comparison result to the generator 102. The signal indicating the comparison signal is a signal indicating the difference between the correct image 124 and the generated image 126, for example. The generator 102 is trained on the basis of the loss signal from the discrimination result determination unit 106 described above and the signal of the comparison result from the image comparison unit 108. It is sufficient to use technology of the related art for this training as well.

The training control unit 110 controls the training of the generator 102 and the discriminator 104. The training control unit 110 loads the training data 120, inputs the included training image 122 into the training image 122, and inputs the included training image 122 and correct image 124 into the discriminator 104. Also, the training control unit 110 provides the signals output by the discrimination result determination unit 106 and the image comparison unit 108 in response to the above input to the generator 102 and the discriminator 104 as feedback, thereby training the generator 102 and the discriminator 104. The generator 102 and the discriminator 104 are trained by updating the weight parameters of the links between the nodes of each neural network according to the fed-back signals.

The generator 102 and the discriminator 104 forming the GAN proceed with training in what is called an adversarial manner, with the generator 102 attempting to generate a fake (the generated image 126) that is as close as possible to the teaching data (the correct image 124), and the discriminator 104 attempting to correctly identify the fake.

For the training of the image processing device, a method similar to the "pix2pix" algorithm (see the paper by Phillip Isola et al., "Image-to-Image Translation with Conditional Adversarial Networks", Berkeley AI Research (BAIR) Laboratory, UC Berkeley) may be used, for example. Also, as another example, a setup similar to GAN called Cycle-GAN may also be used. In the case of using CycleGAN, training becomes possible even in cases where a correct image is not available for all of the input images.

Figure 3:
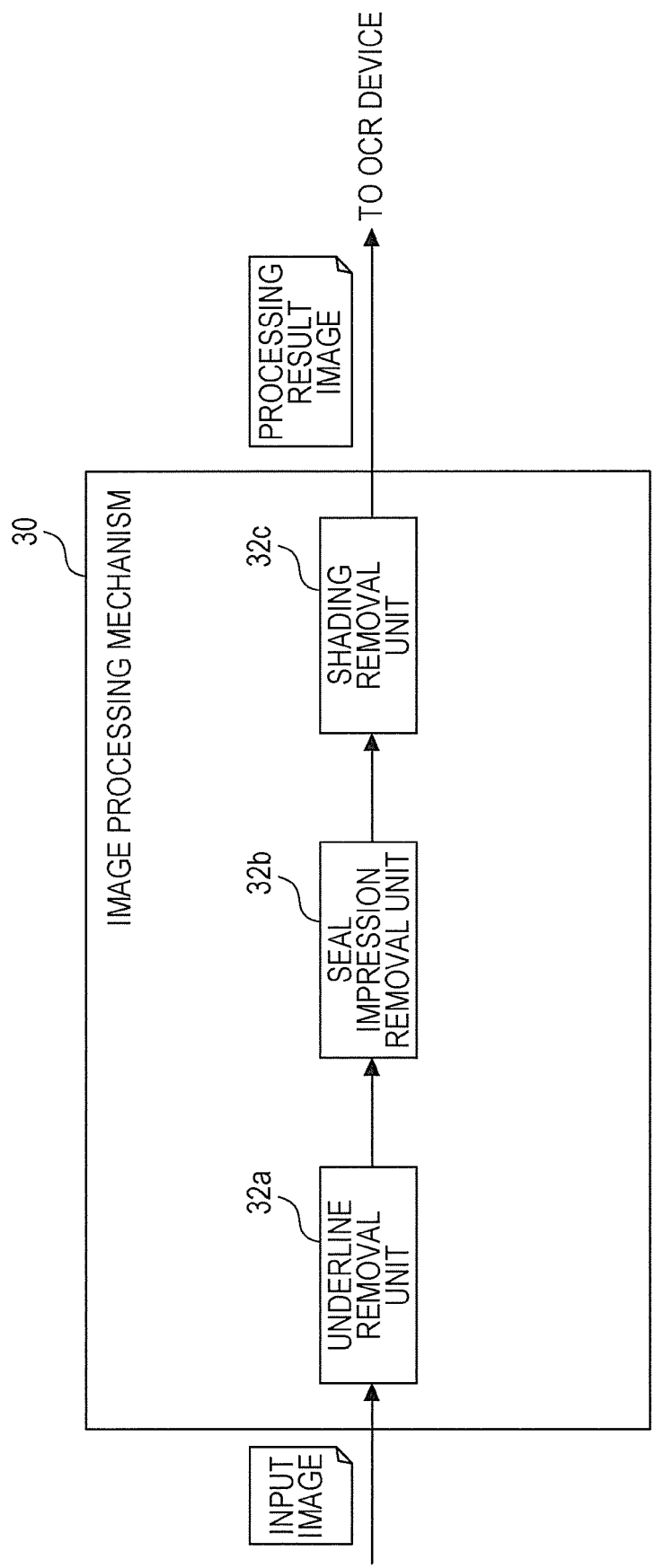
FIG. 3 is a diagram illustrating one example of an application sequence of multiple image processing units (for example, image conversion filters) in an image processing mechanism.
Figure 4:
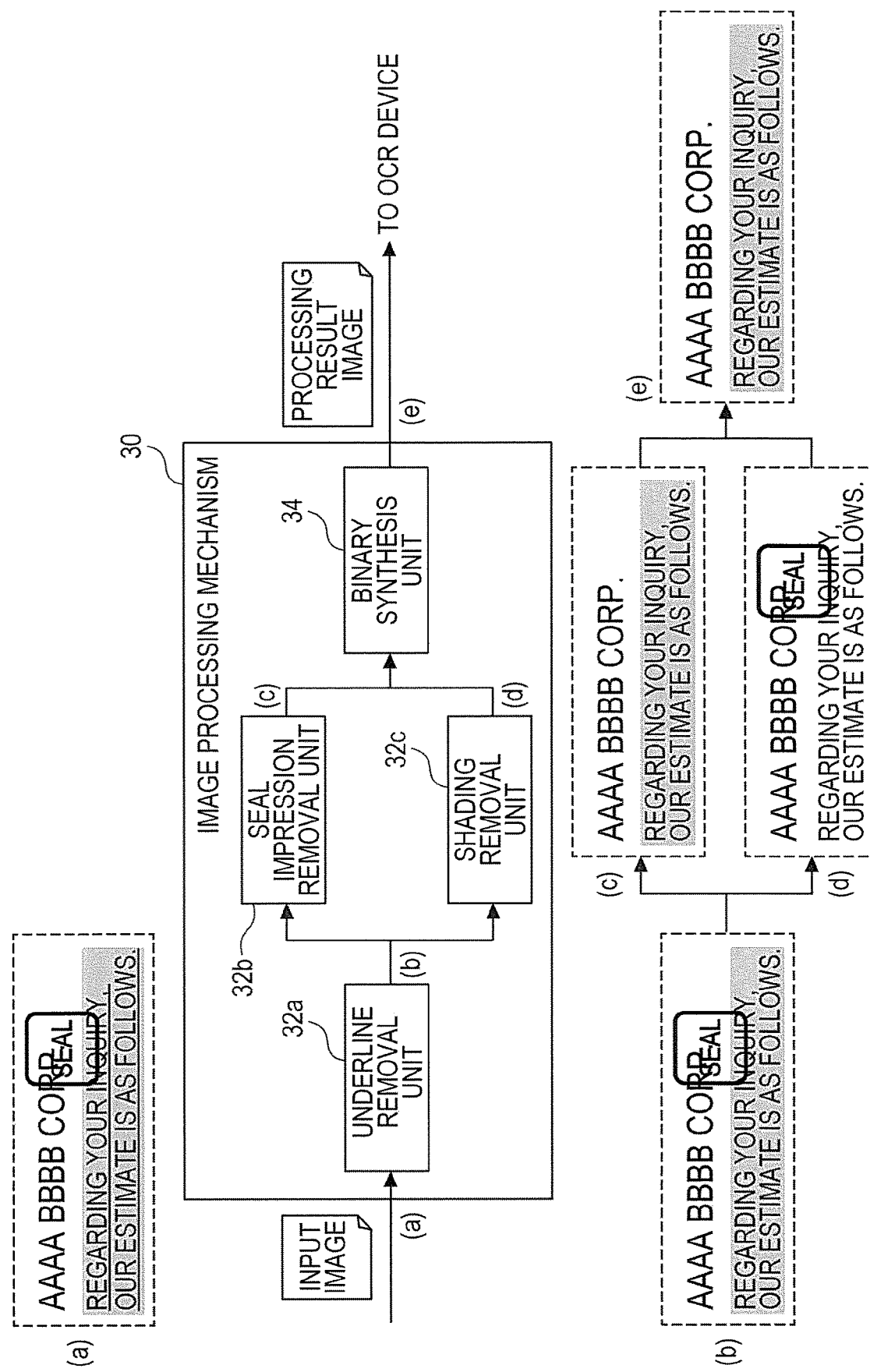
FIG. 4 is a diagram illustrating a different example of the application sequence of multiple image processing units (for example, image conversion filters) in the image processing mechanism.

Next, FIGS. 3 and 4 will be referenced to describe examples of the process of deciding a sequence plan by the sequence planning unit 20. The examples illustrated in FIGS. 3 and 4 are examples of a case in which the image processing mechanism 30 includes an underline removal unit 32a that removes underlines, a seal impression removal unit 32b that removes seal impressions, and a shading removal unit 32c that removes shading as the image conversion filters 32.

The example in FIG. 3 is an example of a case in which the seal impression removal unit 32b suffers from lower performance when the image contains underlines (particularly in the case in which seal impressions and underlines are superimposed) and the shading removal unit 32c suffers from lower performance when the image contains seal impressions or underlines (particularly in the case in which seal impressions or underlines are superimposed onto shading). Note that it is assumed that the quality of underline removal by the underline removal unit 32a is not adversely affected even if the image contains shading and seal impressions, and the quality of seal impression removal by the seal impression removal unit 32b is not adversely affected even if the image contains shading.

In this example, in the case in which an input image containing the three noise features of underlines, seal impressions, and shading is input, as illustrated in FIG. 3, the sequence planning unit 20 outputs a sequence plan for executing image processing in the sequence of the underline removal unit 32a, the seal impression removal unit 32b, and the shading removal unit 32c. Note that it is assumed the input image does not contain noise features other than underlines, seal impressions, and shading. If this sequence plan is followed, the initial underline removal unit 32a removes underlines in an input image without being adversely affected by shading and seal impressions contained in the input image. An image with underlines removed is input into the seal impression removal unit 32b. The seal impression removal unit 32b removes seal impressions in the input image without being adversely affected by shading contained in the input image. An image with seal impressions removed is input into the shading removal unit 32c. Since this image does not contain underlines or seal impressions, the shading removal unit 32c appropriately removes shading contained in the image. As a result, since the processing result image output from the shading removal unit 32c does not include any underlines, seal impressions, or shading that act as noise for OCR, in the case in which a downstream OCR device processes the processing result image, a highly accurate OCR result is obtained.

The example in FIG. 4 is the case in which the following conditions are understood. Namely, the seal impression removal unit 32b suffers from lower performance in the case in which the input image contains underlines, but does not suffer from lower performance even if the input image contains shading. Also, in this example, the shading removal unit 32c suffers from lower performance in the case in which the input image contains underlines, but does not suffer from lower performance even if the input image contains seal impressions. Also, the underline removal unit 32a does not suffer from lower performance even if the image contains shading and seal impressions.

Under these conditions, in the case in which an input image (a) containing the three noise features of underlines, seal impressions, and shading is input, the sequence planning unit 20 outputs a sequence plan in which the seal impression removal unit 32b and the shading removal unit 32c perform processing in parallel after the underline removal unit 32a. In this sequence plan, the processing results from the seal impression removal unit 32b and the shading removal unit 32c are processed by the binary synthesis unit 34, and the image of the processing result is input into a downstream OCR device.

If this sequence plan is followed, the initial underline removal unit 32a removes underlines in the input image (a) without being adversely affected by shading and seal impressions contained in the input image (a). An image (b) with underlines removed is input into each of the seal impression removal unit 32b and the shading removal unit 32c. The seal impression removal unit 32b removes seal impressions in the input image without being adversely affected by shading contained in the input image. An image (c) with seal impressions removed is input into the binary synthesis unit 34. Also, the shading removal unit 32c removes shading in the input image without being adversely affected by seal impressions contained in the input image. An image (d) with shading removed is input into the binary synthesis unit 34. The binary synthesis unit 34 binarizes each of the input images (c) and (d), and synthesizes the two images by taking the AND operation of each pixel. Since seal impression removal and shading removal are both processes that remove elements contained in an image, if the AND operation is performed on each pixel, the portion left over is removed by the other removal process executed in parallel, resulting in a processing result that is substantially the same as the case of executing both of the removal processes. Also, in this example, since the downstream process is an OCR process, performing binarization before AND synthesis does not cause an issue.

Note that in the conditions of the example in FIG. 4, even if processes are executed on the input image in series in the order of the underline removal unit 32a, the seal impression removal unit 32b, and the shading removal unit 32c for example, a processing result of substantially the same quality as the case of the sequence in FIG. 4 is obtained. In the case in which there exist multiple sequences by which processing results of substantially the same quality are obtained in this way, the sequence planning unit 20 may be configured to prioritize the selection of the sequence having the greater number of image conversion filters 32 executed in parallel from among the multiple sequences. In the example of the conditions in FIG. 4, in the case in which the image quality of the final processing result is substantially the same for a first sequence that executes seal impression removal and shading removal in parallel after underline removal and a second sequence that executes processes in series in the order of the underline removal unit 32a, the seal impression removal unit 32b, and the shading removal unit 32c, the first sequence is selected.

As described above, in the exemplary embodiment, in the case of applying the conversion processes of multiple image conversion filters 32 to an input image, the sequence resulting in an optimal final processing result image is computed by the sequence planning unit 20 from among conceivable application sequences. Subsequently, the image processing control unit 40 follows the computed sequence to apply the image conversion filters 32 to the input image in order.

Herein, the final processing result image being "optimal" means that the quality or accuracy of the processing result when a downstream processing device processes the processing result image is the optimal one from among the qualities of the processing results of the downstream processing device in the case of respectively processing the input image according to all conceivable application sequences. For example, in the case in which the downstream processing device is an OCR device, the application sequence expected to result in the most accurate OCR result by the OCR device with respect to the input image is the sequence for which the processing result image becomes optimal.

Note that in some cases, there may be multiple sequences for which the processing result image becomes optimal. For example, in the conditions in FIG. 4 described above, the first sequence that executes the processes of the seal impression removal unit 32b and the shading removal unit 32c in parallel after the underline removal unit 32a and the second sequence that executes processes in series in the order of the underline removal unit 32a, the seal impression removal unit 32b, and the shading removal unit 32c both result in an optimal processing result image.

In the case in which there are multiple sequences for which the processing result image becomes optimal, the sequence planning unit 20 prioritizes the selection of the sequence having the greater number of image conversion filters 32 executed in parallel from among the optimal sequences. For example, consider a case in which it is desirable to apply four (first to fourth) image conversion filters 32 to a certain input image. In this case, assume that a first sequence that applies the second to fourth image conversion filters 32 in parallel after applying the first image conversion filter 32 and a second sequence that applies the third and fourth image conversion filters 32 after applying the first and second image conversion filters 32 in order both result in a processing result image of optimal quality. In this case, the sequence planning unit 20 selects the first sequence having the greater number of image conversion filters 32 executed in parallel as the sequence to apply to the input image.

Prioritizing the selection of the sequence having the greater number of image conversion filters 32 executed in parallel if the qualities of the processing result images are the same in this way is meaningful for the following reasons.

First, the degree of degradation in the processing result image is reduced. This point will be described in detail. When an image conversion filter 32 is applied to an image, a processing result of sufficient quality is obtained for the feature targeted by that image conversion filter 32. However, since the image conversion filter 32 works on the entire image, the quality of the portions other than the targeted feature in the image become degraded to some degree. Consequently, when multiple image conversion filters 32 are applied to an image in series, the image degradation accumulates as the number of image conversion filters 32 increases. In contrast, if there is a portion of the application sequence in which several image conversion filters 32 are applied in parallel, like in the example of FIG. 4, the number of times that the input image is subjected to image conversion decreases by an amount corresponding to the number of parallel filters. For example, in the case of applying three image conversion filters 32 to an input image, if the three are applied in series, the input image is subjected to three image conversions, and three degradations of the image are accumulated. In contrast, even in the case of applying the same three image conversion filters 32, if the application sequence is one in which two of the image conversion filters 32 are executed in parallel, the input image is only subjected to two image conversions in the individual parallel paths, and the number of accumulated image degradations is kept to two. In the case of applying the same number of the image conversion filters 32, as the number of image conversion filters 32 executed in parallel increases, the number of times that the input image is degraded decreases, and therefore the degradation in the final processing result image is reduced.

The second reason is that, in the case of implementing the individual image conversion filters 32 as hardware circuits, as the number of image conversion filters 32 executed in parallel increases, the time taken by the processing is shortened by the parallelization effect. This reason is also relevant in the case of using hardware circuits in which the content of the processing to execute is programmably variable, like DRPs or neurochips. In other words, even in the case in which a limited number of such programmable hardware circuits provided in the image processing device are reused as multiple image conversion filters 32, if it is possible to configure several image conversion filters 32 at the same time in parallel with multiple hardware circuits, the processing time becomes shorter due to parallelization.

<First Example of Construction of Sequence Planning Unit>

Next, examples of the method of constructing the sequence planning unit 20 in the image processing device according to the exemplary embodiment will be given. In the exemplary embodiment, the sequence planning unit 20 learns the process of generating a sequence plan from an input image by machine learning. In this example, the sequence planning unit 20 has a built-in neural network for training.

Figure 5:
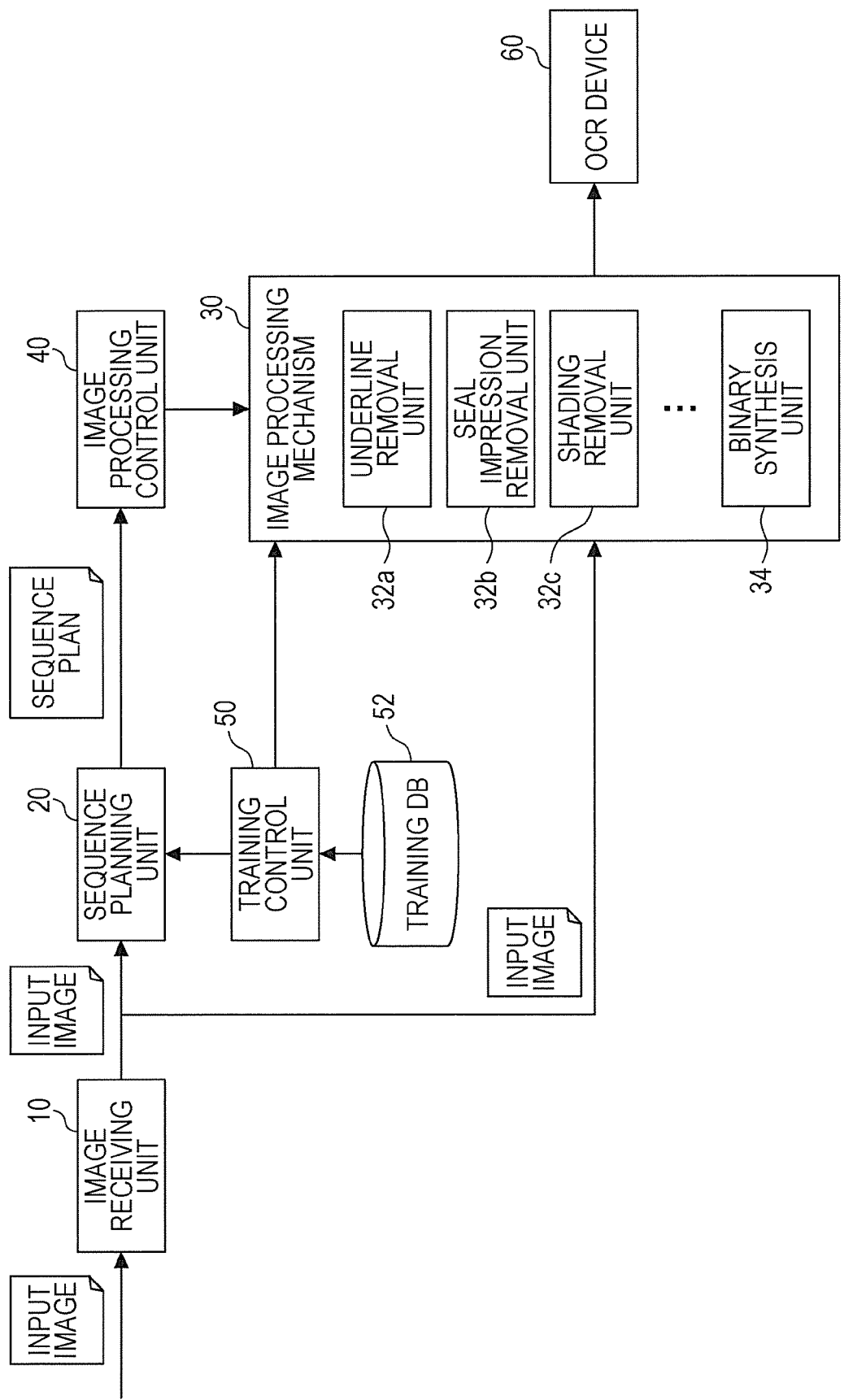
FIG. 5 is a diagram illustrating an example of a configuration of an image processing device provided with a setup for constructing a sequence planning unit by training.

The example illustrated in FIG. 5 is the case in which a system for training the sequence planning unit 20 is incorporated into the image processing device. In FIG. 5, configuration elements which are the same as those illustrated in FIG. 1 are denoted with the same signs.

The image processing device illustrated in FIG. 5 includes a training control unit 50 and a training database (DB) 52. The training control unit 50 is a device that controls the process of training the sequence planning unit 20, and is one example of a training unit. The training DB 52 is a database that stores training data to use in training. In the training DB 52, first, a large number of training images to use in training are stored. The training images are images containing one or more features (for example, noise features) to be dealt with by the image processing of the image processing mechanism 30. Each training image may contain different features. The training images (that is, samples) are prepared according to the purpose of the image processing device. For example, in the case of using the image processing device to perform character recognition on a form of a certain type from a certain corporation, image data (for example, data in PDF format) of past forms of that type from that corporation are prepared and stored in the training DB 52 as the training data.

In this example, the neural network included in the sequence planning unit 20 accepts an image as input, and outputs a sequence plan to be applied to the image. In other words, in this example, the sequence planning unit 20 is implemented as a single neural network.

Figure 6:
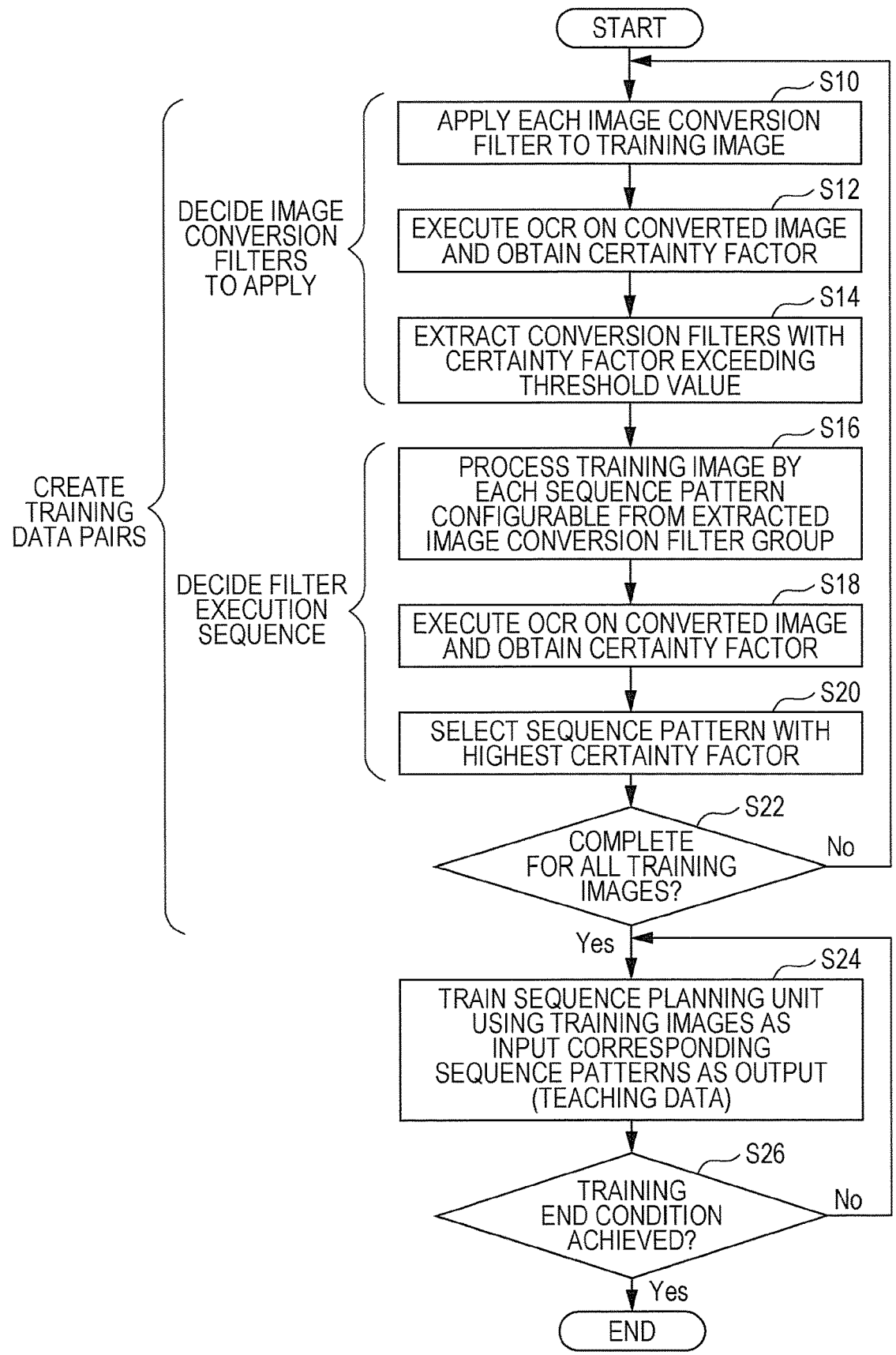
FIG. 6 is a diagram illustrating an example of a procedure for constructing the sequence planning unit by training.

FIG. 6 illustrates an example of a processing procedure by the training control unit 50 in this example. The procedure in this example may be divided roughly into a training data pair creation stage (S10 to S22) and a stage of training the neural network using these training data pairs (S24). The process in the training data pair creation stage (S10 to S22) is repeatedly executed for every training image in the training DB 52 (S22). Also, the training data pair creation stage includes a stage of deciding which image conversion filters to apply (S10 to S14) and a stage of deciding the filter execution sequence (S16 to S20).

First, the process in the stage of deciding which image conversion filters to apply (S10 to S14) will be described further with reference to FIG. 7. In this stage, for every training image in the training DB 52, the training control unit 50 inputs the training image into each image conversion filter 32 included in the image processing mechanism 30 (S10). Subsequently, the images output from the image conversion filters 32 in response to the above input are input into a downstream processing device, such as an OCR device for example (S12). The downstream processing device processes each input image and outputs a processing result. For example, the OCR device outputs an OCR result along with a certainty factor of the OCR result. Subsequently, the training control unit 50 extracts any image conversion filter 32 whose certainty factor exceeds a predetermined threshold value for the training image.

Figure 7:
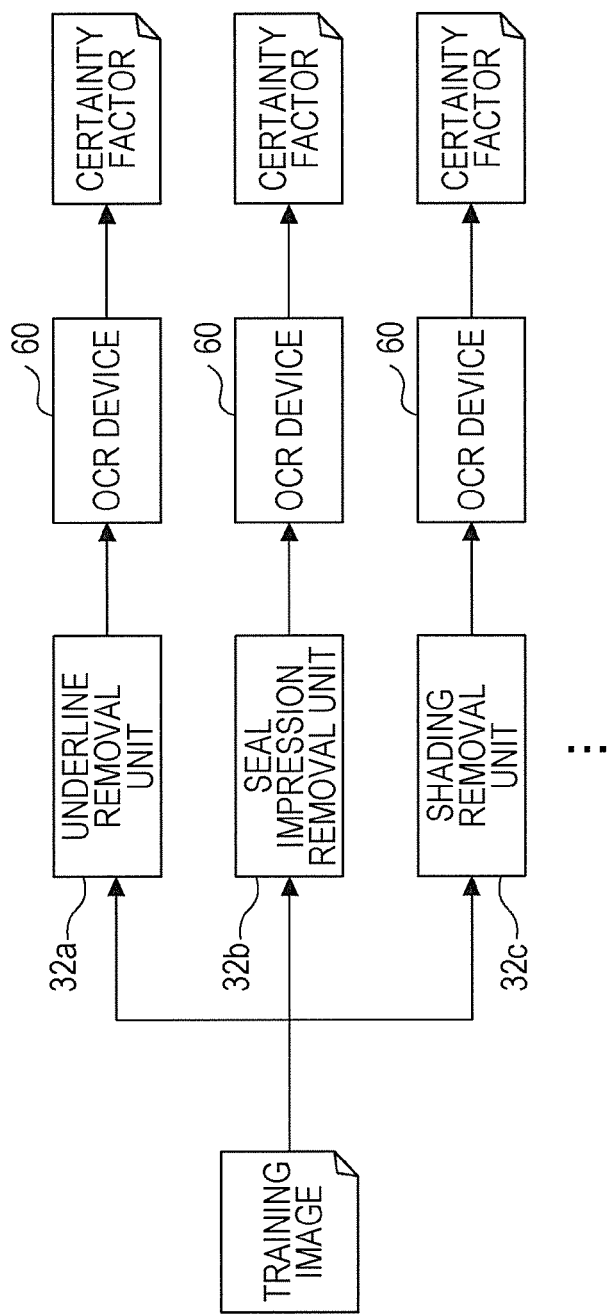
FIG. 7 is a diagram for explaining a process of selecting image conversion filters to use on a training image.

For example, in the example illustrated in FIG. 7, the training control unit 50 causes each image conversion filter 32 such as the underline removal unit 32a, the seal impression removal unit 32b, and the shading removal unit 32c provided in the image processing mechanism 30 to process a training image, and causes an OCR device 60 to process the images of the processing results. Additionally, the training control unit 50 acquires each certainty factor output by the OCR device 60. Subsequently, from among the image conversion filters 32 such as the underline removal unit 32a, the seal impression removal unit 32b, and the shading removal unit 32c, the training control unit 50 extracts any image conversion filter 32 having a certainty factor exceeding the threshold value when the OCR device 60 is made to recognize the processing result of the training image.

In S14, an upper limit may also be imposed on the number of image conversion filters 32 to extract. In this case, if the number of image conversion filters 32 whose certainty factor exceeds the threshold value exceeds the upper limit, the training control unit 50 extracts, up to the upper limit, a number of image conversion filters 32 in order of highest certainty factor. For every training image, the training control unit 50 stores the set of image conversion filters 32 extracted for that training image.

The process in the stage of deciding which image conversion filters to apply (S10 to S14) described above is one example of a selection unit that selects multiple image processing units from a population of image processing units.

Next, the stage of deciding the filter execution sequence (S16 to S20) will be described further while referring to FIGS. 8A and 8B. In this stage, for every training image, the training control unit 50 processes the training image in accordance with each sequence pattern that is configurable by combining the group of image conversion filters 32 extracted in S14 (S16). Additionally, for every sequence pattern, the training control unit 50 causes a downstream processing device, such as the OCR device 60 for example, to process the image obtained by performing processes following that sequence pattern, and obtains the certainty factor of the processing result (S18).

Figure 8B:
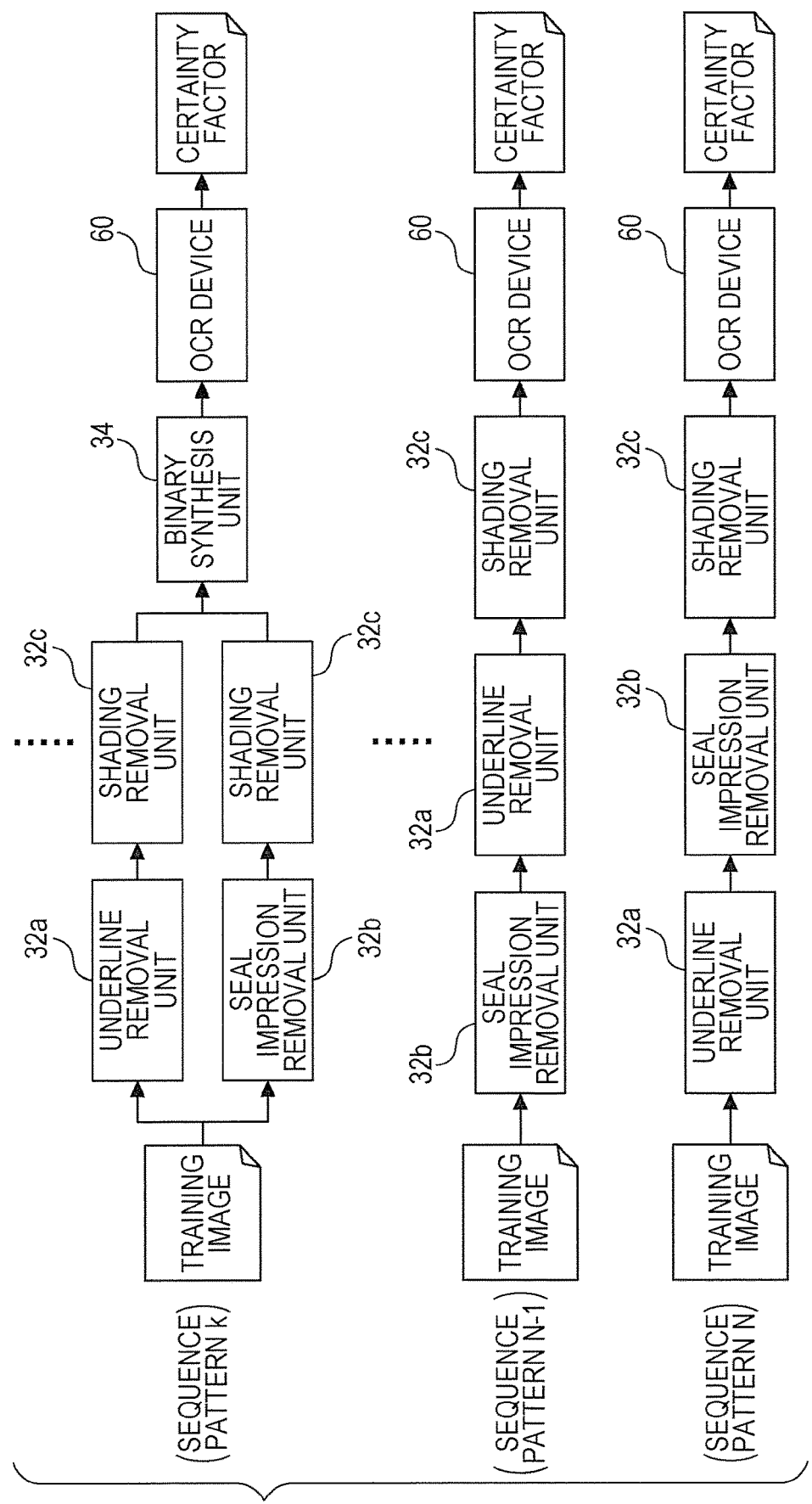
FIG. 8B is a diagram for explaining a process of computing patterns of sequences in which to apply image conversion filters to a training image.

For example, in the case in which the three image conversion filters 32 of the underline removal unit 32a, the seal impression removal unit 32b, and the shading removal unit 32c are extracted in S14, the configurable sequence patterns include those illustrated in FIGS. 8a and 8B.

For example, Sequence Pattern 1 illustrated in FIG. 8A indicates a sequence of executing the three filters in parallel. In this case, the processing results of the training image by each of the three filters are binarized and synthesized by the binary synthesis unit 34, and the synthesized image is input into the OCR device 60. The OCR device 60 executes character recognition on the image and outputs the processing result and the certainty factor. Sequence Patterns 2 and 3 are examples of sequences that first execute one of the three image conversion filters 32, and then execute the two remaining filters in parallel. The output images of the two image conversion filters 32 executed in parallel are binarized and synthesized by the binary synthesis unit 34, and then input into the OCR device 60.

Sequence Pattern k illustrated in FIG. 8B indicates a sequence of first inputting the training image into each of the underline removal unit 32a and the seal impression removal unit 32b, and causing the shading removal unit 32c to process the images of each of the processing results. In other words, Sequence Pattern k is one example of a sequence that first executes two of the three extracted image conversion filters 32 in parallel, and then causes the one remaining filter to process the images of the two processing results. Unlike Sequence Patterns 2 and 3, if two image conversion filters 32 are executed in parallel first, it is necessary to apply the one remaining image conversion filter 32 individually to each of the processing results. The processing results from the shading removal unit 32c on each of the parallel paths are binarized and synthesized by the binary synthesis unit 34, and then input into the OCR device 60.

Sequence Patterns (N−1) and N illustrated in FIG. 8B are examples of executing the three image conversion filters 32 in series. In the case of executing the filters in series, the process by the binary synthesis unit 34 does not have to be executed.

The sequence patterns illustrated in FIGS. 8A and 8B use all of the image conversion filters 32 extracted in S14 (that is, three in the illustrated example). However, in S16 to S18, further trials may be performed for sequence patterns using only a portion of the image conversion filters 32 extracted in S14. For example, sequence patterns including only two from among the underline removal unit 32a, the seal impression removal unit 32b, and the shading removal unit 32c illustrated in FIGS. 8A and 8B may also be applied to the training image similarly to compute the certainty factor.

Returning to the explanation of FIG. 6, in S16 and S18, if certainty factors are computed for the case of processing a certain training image according to each sequence pattern, next, the training control unit 50 selects the sequence pattern having the highest certainty factor among the sequence patterns (S20). In S20, the training control unit 50 may select literally the single sequence pattern with the highest certainty factor, or select multiple sequence patterns in order of highest certainty factor within a range that satisfies certain conditions. The individual conditions may be an upper limit on the number of sequence patterns to select, and may also be a condition of selecting sequence patterns whose certainty factor is a threshold value or greater, for example.

Also, in the case of selecting the sequence patterns having the highest certainty factors within an upper limit, if the certainty factors are substantially the same (for example, if the difference between certainty factors is within a tolerable range), the training control unit 50 prioritizes the selection of the sequence pattern having the greater number of image conversion filters 32 executed in parallel. With this arrangement, the neural network acting as the sequence planning unit 20 prioritizes the training of sequence patterns having a greater number of image conversion filters 32 executed in parallel as the sequence patterns corresponding to the training image.

The training control unit 50 stores the one or more selected sequence patterns, in association with the training image, in the training DB 52. The pair of the training image and the one or more selected sequence patterns is called a training data pair.

Figure 9:
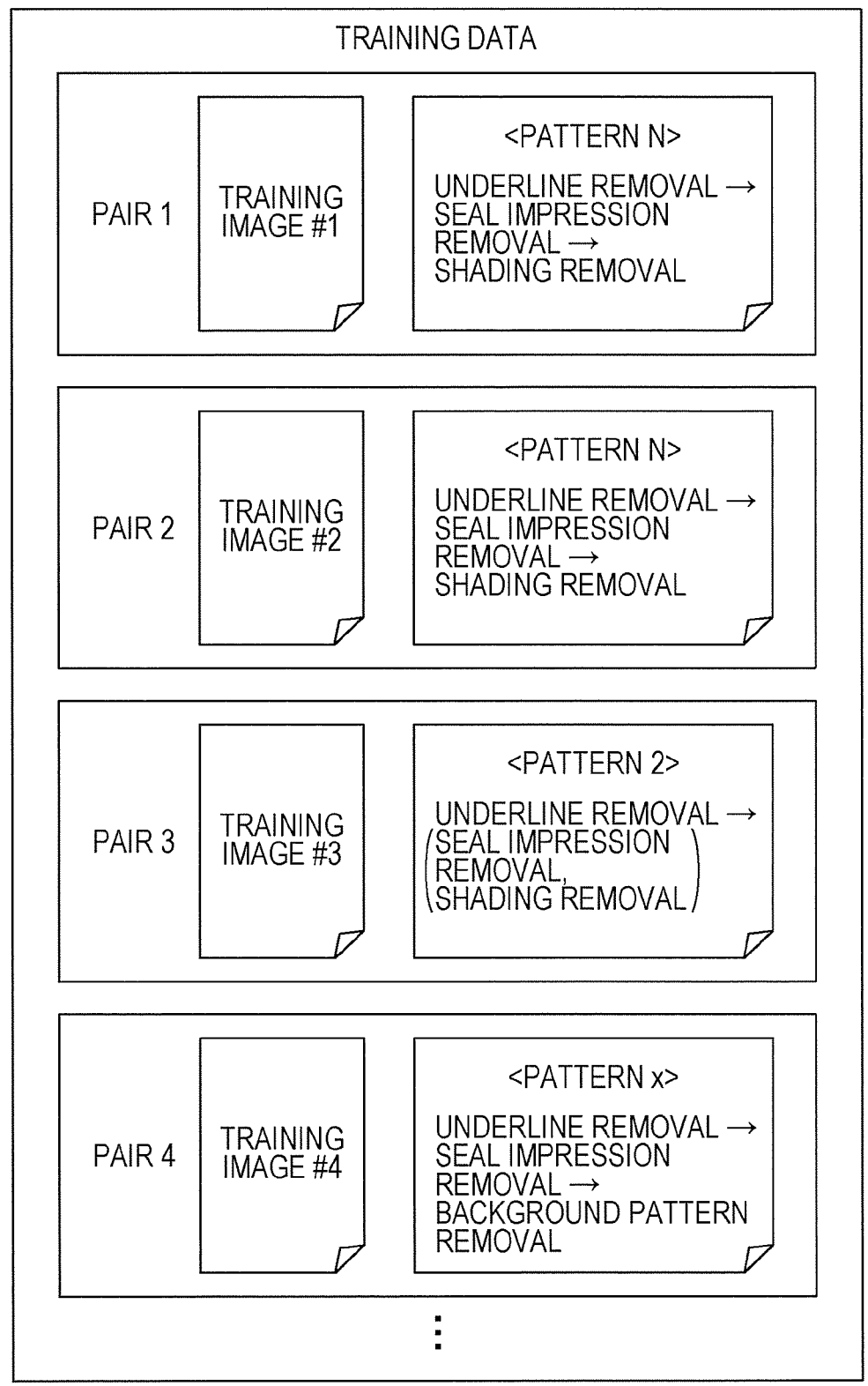
FIG. 9 is a diagram for explaining training data used in the training of a neural network that is to act as the sequence planning unit.

The training control unit 50 repeats the process from S10 to S20 for all training images stored in the training DB 52 (S22). At the stage where the process from S10 to S20 has finished for all training images, training data like the example illustrated in FIG. 9 is stored in the training DB 52. The training data in this example includes multiple training data pairs. For example, the first of the training data pairs ("Pair 1" in the illustrated example) includes the first training image (that is, "Training Image #1") and information about the sequence pattern having the highest certainty factor for that training image. The sequence pattern of Pair 1 is identified by the identification information "N", and the specific sequence indicates executing the underline removal unit 32a, the seal impression removal unit 32b, and the shading removal unit 32c in that order and in series. In the diagram, for the sake of explanation, the sequence corresponding to the sequence pattern included in the pair is indicated explicitly, but in the actual training data pairs, it is sufficient just to have the identification information of the sequence pattern. Note that whereas the sequence patterns included in Pairs 1 to 3 in the example of FIG. 9 are sequences of the three image processes of underline removal, seal impression removal, and shading removal, the sequence pattern included in Pair 4 is a sequence of three image processes including background pattern removal instead of shading removal. This is an example to illustrate that, in some cases, the image processes (for example, the image conversion filters 32) forming a sequence pattern suited to a training image are different for every training image.

Returning to the explanation of FIG. 6, in S22, if it is determined that processing has been completed for all training images, the training control unit 50 trains the neural network that is to act as the sequence planning unit 20 with the group of training data pairs (S24). In other words, the neural network is trained by using the training images and the sequence patterns included in the training data pairs as the input and the teaching data of the neural network, respectively.

Figure 10:
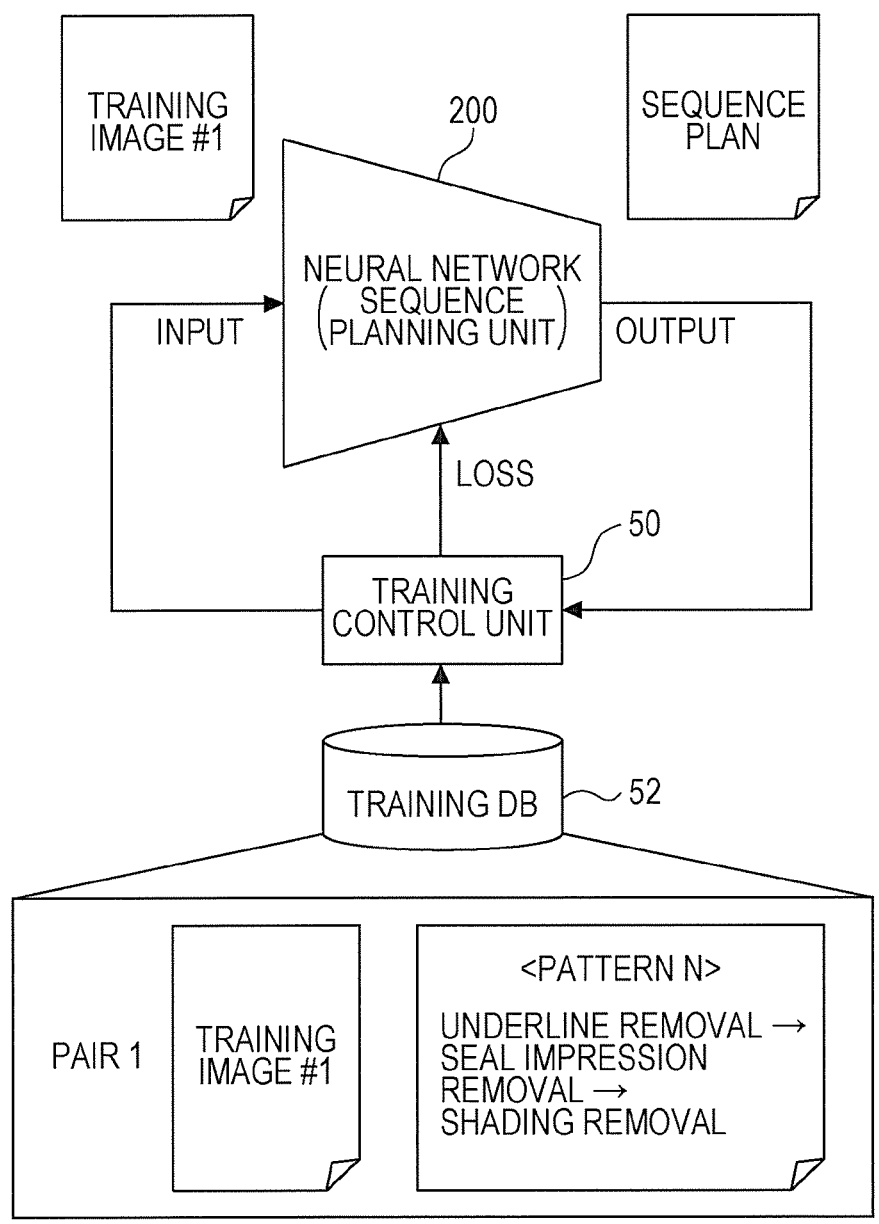
FIG. 10 is a diagram for explaining a method of training the sequence planning unit.

Described in further detail with reference to FIG. 10, for every training data pair, the training control unit 50 inputs the training image included in the pair into a neural network 200 that is to act as the sequence planning unit 20. Next, the training control unit 50 computes the loss (that is, the error) between a sequence plan output by the neural network 200 in response to the input and the sequence pattern included in the training data pair. Subsequently, by feeding back the loss into the neural network 200, the training control unit 50 trains the neural network 200. Note that the above is merely one example, and the neural network 200 used herein may also be a convolutional neural network (CNN).

The training control unit 50 trains the neural network 200 repeatedly using each training data pair until a predetermined training end condition is achieved (S26). The training end condition may be the completion of training for all training data pairs stored in the training DB 52, or the completion of training for a predetermined number of training data pairs, for example. Also, a convergence in the training of the neural network 200 may also be treated as the training end condition. Subsequently, when the training end condition is achieved (that is, if the determination result in S26 is Yes), the training control unit 50 ends the training of the neural network 200.

The neural network 200 that has finished training in this way is used as the sequence planning unit 20. When an image is input into the sequence planning unit 20 constructed in this way, the sequence planning unit 20 outputs a sequence plan suited to the image.

<Second Example of Construction of Sequence Planning Unit>

In the example illustrated above, the entire sequence planning unit 20 is configured as the neural network 200. However, this is merely one example.

Figure 11:
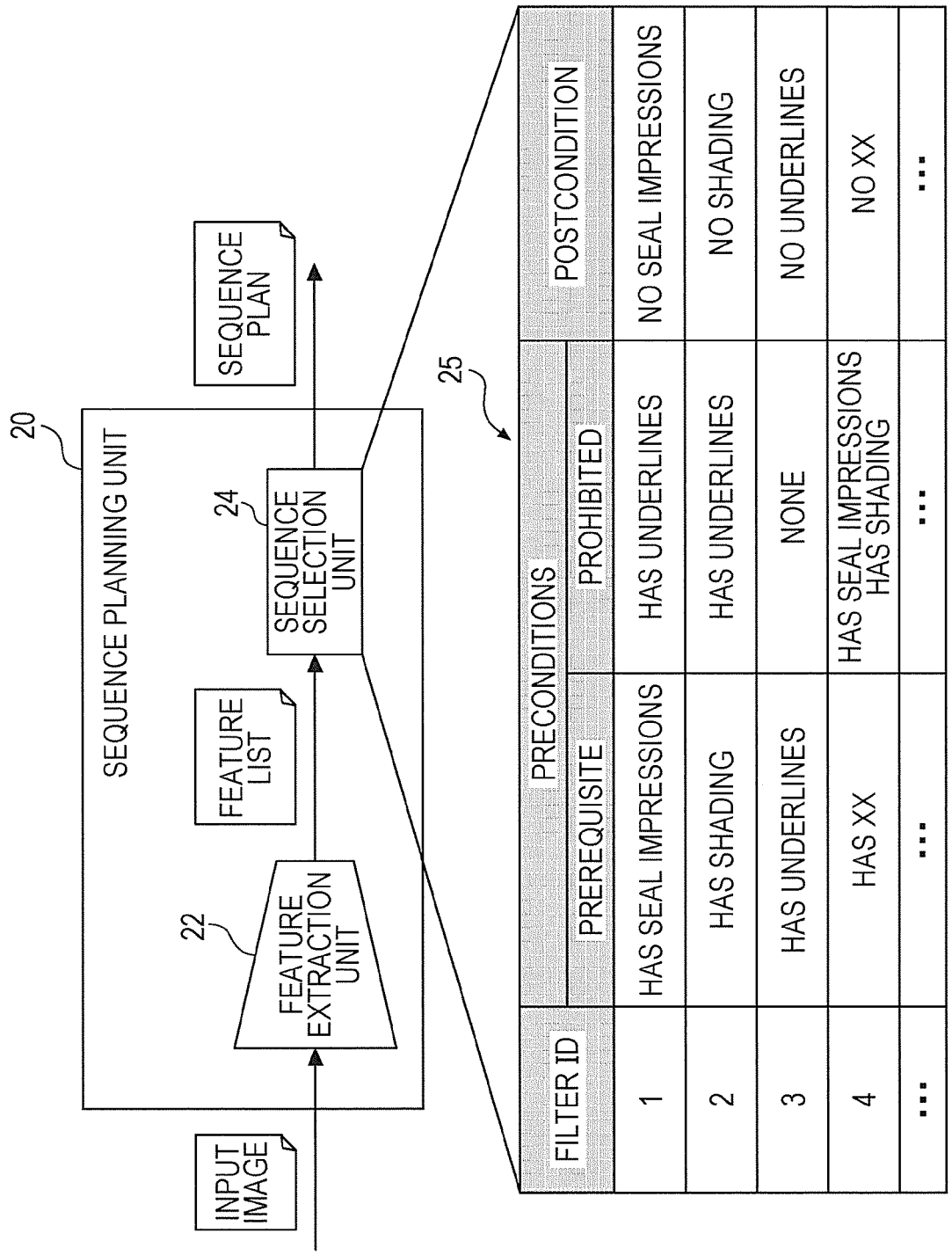
FIG. 11 is a diagram illustrating an example of an internal structure of a different example of the sequence planning unit.

As a different example, as illustrated in FIG. 11, the sequence planning unit 20 may also be configured as a combination of a feature extraction unit 22 and a sequence selection unit 24.

The feature extraction unit 22 extracts features (for example, the noise features described above) contained in the input image. The output of the feature extraction unit 22 is a list of features (in other words, the "feature list" illustrated in the diagram) extracted from the input image. In this example, the feature extraction unit 22 is configured by a neural network.

From the combination of one or more features included in the feature list, the sequence selection unit 24 selects an appropriate sequence plan for dealing with the one or more features. When making the selection, the sequence selection unit 24 references a rule table 25. The rule table 25 illustrated as an example in FIG. 11 prescribes, for every image conversion filter 32, identification information of the image conversion filter 32 (in other words, a "Filter ID"), preconditions, and a postcondition. The preconditions include prerequisite conditions and prohibited conditions. The prerequisite conditions and prohibited conditions are, respectively, desirable conditions to obtain and undesirable conditions not to obtain for the image to which the image conversion filter 32 is to be applied. The postcondition is a condition that obtains for the image output by the image conversion filter 32. For example, the image conversion filter 32 with the filter ID of "1" is applied to an image containing seal impressions as indicated by the prerequisite condition "Has seal impressions", and in addition, is prohibited from being applied to an image containing underlines as indicated by the prohibited condition "Has underlines". Also, as the postcondition "No seal impressions" indicates, the image conversion filter 32 outputs an image from which seal impressions have been removed. Also, the image conversion filter 32 with the filter ID of "4" is applied to an image containing a feature named "XX", but is prohibited from being applied to an image containing at least one of seal impressions and shading, and generates an image in which the feature "XX" has been removed from the input image. The rule table 25 is created in advance on the basis of established knowledge about the individual image conversion filters 32.

For every feature included in the input feature list, the sequence selection unit 24 extracts each image conversion filter 32 whose prerequisite condition "Has" the feature from the rule table 25. With this arrangement, for every feature, one or more "corresponding image conversion filters 32" corresponding to the feature are computed. Next, for every feature included in the feature list, the sequence selection unit 24 selects one "corresponding image conversion filter 32" corresponding to the feature at a time. Subsequently, the sequence selection unit 24 evaluates the sequence patterns that are configurable from the "corresponding image conversion filters 32" selected for every feature, in order of the sequence pattern having the greatest number of image conversion filters 32 executed in parallel.

In this evaluation, the following two points are investigated.

For the first point, the sequence selection unit 24 determines whether or not all of the features included in the feature list are accommodatable by the combination of "corresponding image conversion filters 32" forming the sequence pattern. This determination is made on the basis of the postconditions of the "corresponding image conversion filters 32". In the case in which not all of the features are accommodatable with the combination of "corresponding image conversion filters 32" forming the sequence pattern, the sequence selection unit 24 does not adopt the sequence pattern.

For the second point, the sequence selection unit 24 checks whether or not the sequence indicated by the sequence pattern is prohibited by the prohibited conditions of each "corresponding image conversion filter 32" forming the sequence pattern. The sequence selection unit 24 does not adopt a sequence pattern understood to be prohibited by this check.

Through the first and second evaluations, the sequence selection unit 24 is able to adopt a sequence pattern capable of accommodating all of the features included in the feature list and also not prohibited by the prohibited conditions.

For example, in the case of using the rule table 25 illustrated as an example in FIG. 11, consider a case in which the three noise features of underlines, seal impressions, and shading are extracted from an input image. Additionally, assume that the three image conversion filters 32 having the filter IDs "1", "2", and "3" are extracted according to these noise features. In this case, by investigating the postconditions of the three image conversion filters 32, the sequence selection unit 24 confirms that, if these three filters are used, all three of the noise features of underlines, seal impressions, and shading may be accommodated (that is, in this case, may be removed). In other words, it is understood that the combination of these three image conversion filters 32 passes the first evaluation point described above.

Accordingly, the sequence selection unit 24 checks whether or not, from among the sequence patterns configurable from these three image conversion filters 32, the sequence pattern having the greatest number of image conversion filters 32 executed in parallel, that is, the sequence pattern that executes the three image conversion filters 32 in parallel, is prohibited by the prohibited conditions. For example, the input image containing underlines is a prohibited condition for the image conversion filter 32 with the filter ID of "1". However, since the input image to be processed contains underlines, inputting the input image into this image conversion filter 32 conflicts with the prohibited condition. Consequently, the sequence selection unit 24 determines, according to the prohibited condition, not to adopt the initial sequence pattern that executes the three image conversion filters 32 in parallel. Accordingly, the sequence selection unit 24 evaluates the sequence patterns having the next greatest number of image conversion filters 32 executed in parallel, or in other words, the sequence patterns that execute two image conversion filters 32 in parallel.

For example, assume that the sequence selection unit 24 evaluates sequence patterns that first execute two image conversion filters 32 in parallel, and then apply the one remaining image conversion filter to each of the conversion results. In this case, since the input image contains the three noise features of underlines, seal impressions, and shading irrespectively of which two of the filter IDs "1", "2", and "3" are initially executed in parallel, at least one of the two will conflict with the prohibited condition. For this reason, the sequence selection unit 24 determines not to adopt any of the sequence patterns that first execute two image conversion filters 32 in parallel.

Next, the sequence selection unit 24 evaluates sequence patterns that first apply one of the three image conversion filters 32 to the input image, and then apply the two remaining filters to the image of the conversion result by the first filter. For example, consider the evaluation of the sequence pattern that initially applies the image conversion filter 32 with the filter ID of "3" (that is, the filter that removes underlines), and next applies the two remaining image conversion filters 32 in parallel. In this case, the image conversion filter 32 with the filter ID of "3" does not have a prohibited condition, and therefore is applicable even if the input image contains the three noise features of underlines, seal impressions, and shading. The image output by this image conversion filter 32 does not contain underlines, and contains only seal impressions and shading. The two image conversion filters 32 with the filter IDs "1" and "2" that are applied in parallel next only have prohibited conditions against an image containing underlines, and therefore do not conflict with the prohibited conditions even if the output from the initial underline removal filter is input. Consequently, since this sequence pattern does not conflict with any of the prohibited conditions of the image conversion filters 32 to use, the sequence selection unit 24 adopts the sequence pattern. In other words, the sequence selection unit 24 selects this sequence pattern as the sequence plan to apply to the input image.

In this example, the sequence selection unit 24 evaluates sequence patterns in order of the greatest number of image conversion filters 32 executed in parallel, and upon finding the first sequence pattern that does not conflict with the prohibited conditions of all included image conversion filters 32, the sequence selection unit 24 adopts that sequence pattern. Consequently, the sequence pattern adopted by the sequence selection unit 24 becomes the sequence pattern having the greatest number of image conversion filters 32 executed in parallel from among the sequence patterns not prohibited by any of the prohibited conditions.

The rule table 25 illustrated as an example above is one example of sequence prescription information. Additionally, the procedure of "evaluating sequence patterns in order of the greatest number of image conversion filters 32 executed in parallel from among the sequence patterns configurable from the combination of image conversion filters 32 corresponding to each feature extracted from the input image, and adopting the first discovered sequence pattern not prohibited by the prohibited conditions" is also one example of sequence prescription information. Additionally, the combination of the above procedure and the rule table 25 is also one example of sequence prescription information.

Figure 12:
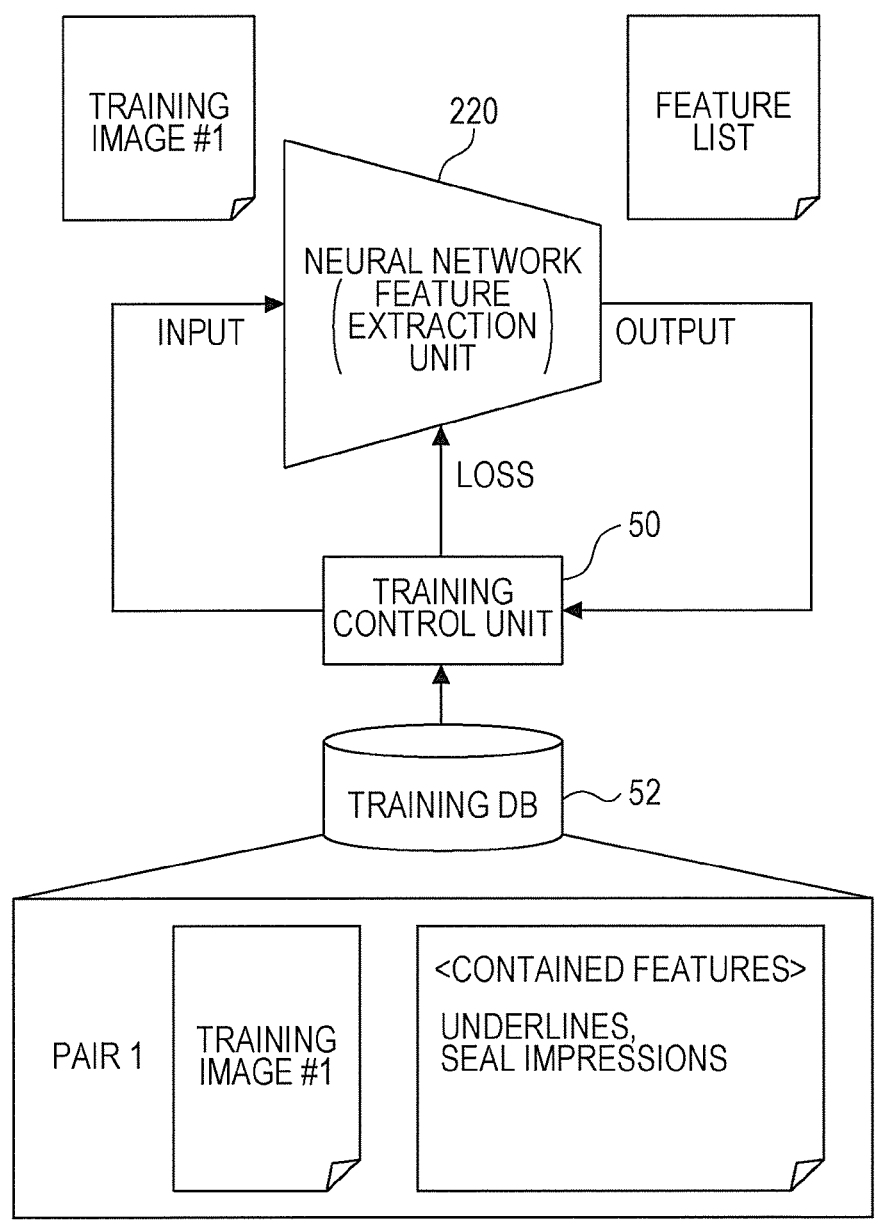
FIG. 12 is a diagram for explaining a method of training a feature extraction unit.

Next, an example of the method of training the neural network of the feature extraction unit 22 will be illustrated. For this training, similarly to the example illustrated in FIG. 12, a large number of pairs of a training image and a list of features (for example, noise features) contained in the training image are prepared and registered in the training DB 52. For each of these pairs, the training control unit 50 inputs the training image included in the pair into a neural network 220. The neural network 220 outputs a list of features contained in the input image. The training control unit 50 compares the list of features output by the neural network 220 to the list of features registered in the training DB 52 in association with the training image, and computes the loss expressing the error between the two. Subsequently, by feeding back the loss into the neural network 220, the training control unit 50 trains the neural network 220. The neural network 220 is trained using these pairs until a predetermined training end condition is satisfied. The neural network 220 that has finished training in this way is used as the feature extraction unit 22.

In the example illustrated in FIG. 5, the training control unit 50 and the training DB 52 that train the neural network included in the sequence planning unit 20 are included inside the image processing device, but this is merely one example. Instead, a system provided with a neural network, the training control unit 50, and the training DB 52 may be prepared outside of the image processing device, and the neural network may be trained according to the methods described above. In this case, it is sufficient to download prescription information that prescribes the trained neural network from the system to the sequence planning unit 20 inside the image processing device. The prescription information to download is information that prescribes, for example, the node configuration in each layer of the trained neural network, the patterns of links joining the nodes in each layer, the weights of each of these links, and the like.

Also, although the above describes an example in which the sequence planning unit 20 includes a neural network, the sequence planning unit 20 may also include a device using a machine learning method other than a neural network.

The image processing device described above may also be realized by causing a computer to execute a program expressing the functions of the element group forming the image processing device. Herein, the computer includes hardware having a circuit configuration in which a microprocessor such as a CPU, memory (first storage) such as random access memory (RAM) and read-only memory (ROM), a controller that controls a fixed storage device such as flash memory, a solid-state drive (SSD), or a hard disk drive (HDD), various input/output (I/O) interfaces, a network interface that controls connections to a network such as a local area network, and the like are interconnected via a bus or the like, for example. A program stating the processing content of each of these functions is saved to the fixed storage device such as flash memory via the network or the like, and installed in the computer. By having the CPU or other microprocessor load the program stored in the fixed storage device into RAM and execute the program, the function module group exemplified in the foregoing is realized. In addition, some or all of these elements of the image processing device may also be configured as a hardware circuit.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing device comprising:
   a plurality of image processing units, each trained to accommodate a different feature possibly contained in an image;
   a decision unit that decides a sequence of the plurality of image processing units according to the features contained in an input image;
   an application unit that applies the image processing units to the input image in the sequence decided by the decision unit; and
   a training unit that, by inputting a training image and the sequence by which an image processing result for the training image becomes optimal into the decision unit, trains the decision unit to output the optimal sequence of the plurality of image processing units in a case in which the training image is input,
   wherein in the case in which a plurality of the sequences for which the image processing result for the training image becomes optimal exists, the training unit trains the decision unit to prioritize associating the sequence having a greater number of different image processing units applied in parallel from among the plurality of sequences with the training image.

2. The image processing device according to claim 1, wherein
   the training unit includes a selection unit that selects the plurality of image processing units from a population of the image processing units, and
   the selection unit selects the plurality of image processing units in order of a favorable image processing result when the image processing unit is applied to the training image from among the image processing units included in the population.

3. The image processing device according to claim 1, wherein
   the decision unit extracts one or more features contained in the input image, and decides the sequence on a basis of the extracted combination of one or more features.

4. The image processing device according to claim 3, wherein
   the decision unit references sequence prescription information that prescribes the sequence corresponding to a combination of one or more of the features, and decides the sequence corresponding to the combination of one or more features extracted from the input image.

5. The image processing device according to claim 4, wherein
the sequence prescription information is information that prescribes prioritizing a selection of a sequence having a greater number of different image processing units applied in parallel.

6. The image processing device according to claim 1, wherein
the decision unit prioritizes deciding the sequence having a greater number of different image processing units applied in parallel as the sequence to apply to the input image.

7. The image processing device according to claim 2, wherein
the decision unit prioritizes deciding the sequence having a greater number of different image processing units applied in parallel as the sequence to apply to the input image.

8. A non-transitory computer readable medium storing a program causing a computer to execute a process for processing an image, the process comprising:
training each of a plurality of image processing units to accommodate a different feature possibly contained in an image;
deciding a sequence of the plurality of image processing units according to the features contained in an input image;
applying the image processing units to the input image in the decided sequence; and
by inputting a training image and the decided sequence by which an image processing result for the training image becomes optimal, outputting the optimal sequence of the plurality of image processing units in a case in which the training image is input,
wherein in the case in which a plurality of the sequences for which the image processing result for the training image becomes optimal exists, associating the sequence having a greater number of different image processing units applied in parallel from among the plurality of sequences with the training image is prioritized.

9. An image processing device method comprising:
training each of image processing units to accommodate a different feature possibly contained in an image;
deciding a sequence of the image processing units according to the features contained in an input image;
applying the image processing units to the input image in the decided sequence; and
by inputting a training image and the decided sequence by which an image processing result for the training image becomes optimal, outputting the optimal sequence of the plurality of image processing units in a case in which the training image is input,
wherein in the case in which a plurality of the sequences for which the image processing result for the training image becomes optimal exists, associating the sequence having a greater number of different image processing units applied in parallel from among the plurality of sequences with the training image is prioritized.

* * * * *